United States Patent [19]

Paul et al.

[11] Patent Number: 4,988,785
[45] Date of Patent: Jan. 29, 1991

[54] BISMALEIMIDE RESIN BASED ON INDANE BISPHENOL

[75] Inventors: Charles W. Paul, Madison; Kundan M. Patel, Landing, both of N.J.; Stephen C. Arnold, New Hope, Pa.

[73] Assignee: Allied-Signal, Morris Township, Morris County, N.J.

[21] Appl. No.: 375,178

[22] Filed: Jun. 30, 1989

[51] Int. Cl.$^5$ .............................................. C08F 26/06
[52] U.S. Cl. ................................. 526/259; 524/548; 526/262; 528/322
[58] Field of Search ................ 526/259, 262; 528/322; 524/548

[56] References Cited

U.S. PATENT DOCUMENTS

| Re. 29,316 | 7/1977 | Bargain et al. | 528/322 |
|---|---|---|---|
| 3,634,089 | 1/1972 | Hamb | 96/87 |
| 3,658,764 | 4/1972 | Lyon et al. | 260/78 |
| 4,100,140 | 7/1978 | Zahir et al. | 526/90 |
| 4,127,615 | 11/1978 | Zahir et al. | 260/837 |
| 4,130,600 | 12/1978 | Zahir et al. | 260/830 |
| 4,131,632 | 12/1978 | Suzuki et al. | 260/834 |
| 4,205,160 | 5/1980 | Gloth et al. | 528/425 |
| 4,689,378 | 8/1987 | Chaudhari et al. | 526/259 |

OTHER PUBLICATIONS

J. C. Wilson, "Polyamides and Polyesters Derived from 1,1,3-Trimethyl-3-(p-aminophenyl)-5-indanamine and 1,1,13-Trimethyl—3-(p-hydroxyphenyl)-5-indano", *J. of Polymer Science: Polymer Chemistry Edition*, 1975, vol. 13, pp. 749-754.

*Primary Examiner*—Harold D. Anderson
*Attorney, Agent, or Firm*—R. C. Stewart, II; G. H. Fuchs; D. L. Webster

[57] ABSTRACT

Bismaleimide resins based on indane bisphenol and composites formed from such resins.

21 Claims, No Drawings

BISMALEIMIDE RESIN BASED ON INDANE BISPHENOL

BACKGROUND OF THE INVENTION

1. Field of the Invention

This invention relates to novel indane based polymers. More particularly, this invention relates to novel bismaleimide indane polymers.

2. Prior Art

Indane based polymers are known. For example, U.S. Pat. No. 3,634,089 describes various polyesters of 1,1,3-trialkyl-5-carboxy-3-(p-carboxyphenyl) bis-phenols. These polymers are described as film forming, and as having high heat distortion temperatures and good optical clarity. U.S. Pat. No. 4,205,160 describes terpolymers containing from 20% to 100% of 1,1,3-trimethyl-3-phenyl indane in which the remaining recurring units of 2,4-diphenyl-4-methyl-2-pentene and 2,4-diphenyl -4-methyl -1- pentene. The polymers are disclosed as being useful as lubricants and molding aids for crystallizable polyester resins, especially polyethylene terephthalate. Wilson, John C, Journal of Polymer Science: Polymer Chemistry Edition, "Polyamides and Polyesters derived from 1,1,3-Trimethyl-3-(p-aminophenyl)-5-indanamine and 1,1,3-Trimethyl-3-(p-hyroxyphenyl) -5-indanol", Polymer Chemistry Edition, Vol 13, pp. 749–754 (1975), describes the preparation and characterization of various indane based polyamides and polyesters.

It is known that bis-maleimides can be utilized for the preparation of various polyaddition and polymerization products. Currently utilized bis-maleimide system include those described in U.S. Pat. Nos. 3,658,764, 4,100,140, 4,689,378, 4,127,615, 4,130,600, 4,131,632 and Re. 29,316.

SUMMARY OF THE INVENTION

This invention is directed to a precured heat curable composition comprising a mixture of:

(a) a poly (maleimide) compound of the formula:

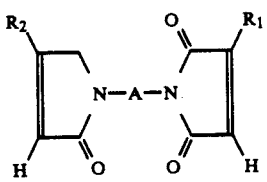

and (b) an indane bisphenol compound of the formula:

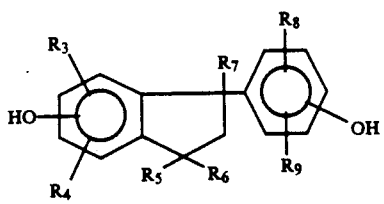

wherein:
$R_1$, $R_2$, $R_4$, $R_5$, $R_6$, $R_7$ and $R_9$ are the same or different at each occurrence and are hydrogen, cycloalkenyl, alkyl, alkoxyphenyl, phenyl, alkylphenyl, alkenyl, phenylalkyl, alkoxy, alkoxyalkyl, nitro, halogen, cyano, cycloalkyl or hydroxy;

A is a divalent organic moietyl having from 1 to about 30 carbon atoms; and
$R_3$ and $R_8$ are the same or different at each occurrence and are alkenyl;
wherein open vaterrcies are substituted with hydrogen atoms.

Another aspect of this invention relates to "partially cured", "incompletely cured" and "completely cured" compositions derived from heat curing the above-referenced composition to the extent required to form the desired composition. As used herein, "precured" denotes the heat curable composition described above in which substantially about 100 mole percent of the curable groups in the composition are not reacted; "partially cured" denotes a composition derived by curing the heat curable composition described above in which from greater than 0 to about 60 mole percent of the curable groups in the composition are reacted as shown by infrared spectrophotometry; "incompletely cured" denotes a composition derived directly or indirectly by curing the above-referenced heat curable composition described above in which from about 60 to about 80 mole percent of the curable groups in the compositions are reacted as shown by infrared spectrophotometry; "completely cured" denotes a composition derived directly or indirectly by curing the above-referenced heat curable composition described above in which more than about 80 mole percent of the curable groups on the composition are cured as shown by infrared spectrophotometry;

Yet another aspect of this invention relates to composites which comprises:
(a) a particulate and/or fibrous filler; and
(b) a precured, partially cured, incompletely cured or completely cured composition of this invention.

DESCRIPTION OF THE PREFERRED EMBODIMENTS

The composition of this invention includes two essential ingredients. One essential component of the composition is a polymaleimide compound of the formula:

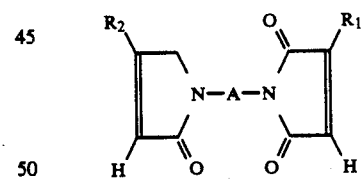

wherein $R_1$, $R_2$ and A are as described above. Illustrative of useful $R_1$ and $R_2$ groups are hydrogen or alkyl such as methyl, ethyl, propyl, butyl, octyl, sec-butyl, tert-butyl, isopropyl, pentyl, hexyl, and the like. Representative A radicals include aryl groups such as groups of the formula: wherein:

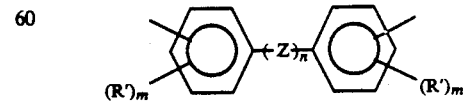

wherein:
—Z— is $+C(R_{10}R_{11})+$ where $R_{10}$ and $R_{11}$ are the same or different and are hydrogen, aryl, alkyl or alkyl, or aryl substituted with one or more fluoro-groups, —SO$_2$—, —SO—, —S—, —O—, C(O), OC(O), —S—S— and —C(O)O—;

n is 1 or 0;

m is 0, 1, 2, 3 or 4;

R' is the same or different at each occurrence and is alkoxyalkyl, alkylphenyl, alkyl, fluoroalkyl, alkoxy, perfluoroalkyl, alkoxyphenyl or phenylalkyl; wherein the open valences are substituted with hydrogen atoms.

Exemplary of other "A" groups are aliphatic groups such as alkylene groups as for example methylene, propylene, ethylene, butylene, dimethylmethylene, aromatic and the like; and arylene such as phenylenes as for example 1,4-phenylene, 1,3-phenylene and the like; biphenylenes such as 4,4'-biphenylene, 3,3'-biphenylene, 4,3'-biphenylene and the like; and naphthalene such as 2,7-naphthalene, 3,7-naphthalene, 3,8-naphthalene, 2,8-naphthalene and the like; cycloalkylene such as 1,4-cyclohexane, 1,4-cycloheptane, and the like; alkylenephenylene alkylene such as methylene, 1,4-diethylene-3-methylphenyl and the like; alkylphenylene such as 2-methyl-1,4-phenylene, 3-alkoxy-1,4-phenylene and the like.

Useful R' groups include alkyl such as methyl, ethyl, propyl, isopropyl, octyl, heptyl and the like; alkoxy such as methoxy, propoxy, hexoxy, octoxy and the like; alkylphenyl and phenylalkyl such as benzyl, phenethyl, methylphenyl, 2,4-dimethylphenyl, ethylphenyl and the like; and alkoxyalkyl such as methoxymethyl ethoxymethyl, methoxyethyl and the like.

Illustrative of useful poly maleimide compounds are:
N,N'-ethylene-bis maleimide
N,N'-hexamethylene-bis-maleimide
N,N'-m-phenylene-bis-maleimide
N,N'-p-phenylene-bis-maleimide
N,N'-4,4'-diphenylmethane-bis maleimide
N,N'-4,4'-dichloro-3,3-diphenylmethane bis maleimide
N,N'-4,4'-(diphenylether)-bis maleimide
N,N'-4,4'-bisphenyl sulphone-bis maleimide
N,N'-4,4'-dicyclohexylmethane bis-maleimide
N,N'-2,2'-4,4'-dimethylenecyclohexane bis-maleimide
N,N'-M-xylylene-bis-maleimide
N,N'-p-xylylene-bis-maleimide
N,N'4,4'-diphenylcyclohexane-bis-maleimide
N,N'-m-phenylene-bis-citraconimide
N,N'-4,4'-diphenylmethane-bis-citraconimide
N,N'-4,4'-2,2'-diphenylpropane-bis-maleimide
N,N'-X,X'-1,3-dispropylene-5,5-dimethyl hydantoin-bis-maleimide
N,N'-4,4'-diphenylmethane-bis itaconimide
N,N'-p-phenylene-bis-itaconimide
N,N'-4,4'-bisphenylmethane-bis-dimethylmaleimide
N,N'-4,4'-2,2'-diphenylpropane bis-dimethylmaleimide
N,N'-hexamethylene-bis-dimethylmaleimide
N,N'-4,4'-(diphenylether)-bis dimethylmaleimide
N,N'-4,4'-diphenylsulphone-bis-dimethylmaleimide
N,N'-2,7-naphthalene-bismaleimide Preferred polymaleimide compounds for use in the practice of this invention as those in which A is a moiety of the formula:

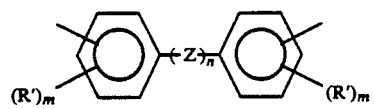

wherein:

m is 0, 1, 2 or 3;

n is 0 or 1;

R' is alkyl, alkoxy, fluoro, trihalomethyl, phenyl, alkoxyphenyl, alkylphenyl, phenylalkyl or alkoxyalkyl;

Z is —O—, —C(O)—, —S—, —SO$_2$— or a moiety of the formula:

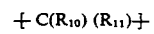

wherein R$_{10}$ and R$_{11}$ are the same or different and are hydrogen, alkyl, phenyl, alkyl substituted with one or more alkoxy or fluoro substituents, or phenyl substituted with one or more alkyl, alkoxy or fluoro substituents; and R$_1$ and R$_2$ are the same or different at each occurrence and are hydrogen or alkyl having from 1 to about 10 carbon atoms.

In the particularly preferred embodiments of the invention polymaleimide compounds are those in which A is a moiety of the formula:

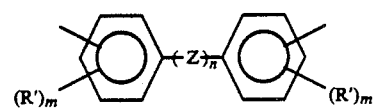

wherein:

R is alkyl or, alkoxy each having from 1 to about 7 carbon atoms, fluoro or trifluoromethyl;

n is 0 or 1;

m is 0, 1 or 2;

z is —O—, —C(O), —SO$_2$, or a moiety of the formula:

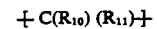

wherein R$_{10}$ and R$_{11}$ are the same or different at each occurrence are hydrogen, or substituted or unsubstituted alkyl having from 1 to about 7 carbon atoms or phenyl wherein permissible substituents are one or more fluoro groups; and R$_1$ and R$_2$ are the same or different at each occurrence and are hydrogen or alkyl having from 1 to about 7 carbon atoms.

In the most preferred embodiments of the invention polymaleimide compounds for use are those in which:

A is a moiety of the formula:

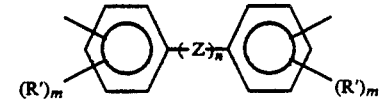

wherein:

n is 0 or 1;

m is 0 or 1;

R' is alkyl having from 1 to about 4 carbon atoms;

Z is —O—, C(O)—, —SO$_2$— or a moiety of the formula:

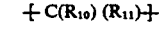

wherein R$_{10}$ and R$_{11}$ are the same or different and are hydrogen, phenyl or substituted or unsubstituted alkyl having from 1 to 4 carbon atoms (wherein permissible substituents are one or more fluoro groups; and $R_1$ and $R_2$ are the same or different and are hydrogen or alkyl having from 1 to about 4 carbon atoms.

The other essential ingredient of the curable composition of this invention is an indane bisphenol of the formula:

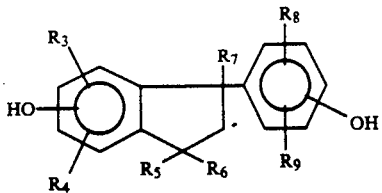

wherein $R_3$ to $R_9$ and n are as described above. Illustrative of useful $R_3$ and $R_8$ groups are alkenyl having from 3 to about 10 carbon atoms such as allyl, propenyl, butenyl, pentenyl, isopropenyl, isobutenyl, hexenyl, heptenyl, octenyl, and the like.

Illustrative of useful $R_4$, $R_5$, $R_6$, $R_7$ and $R_9$ groups are nitro; cyano; halogen; hydrogen; alkyl such as methyl, ethyl, butyl, pentyl, octyl, nonyl, tert-butyl, neopentyl, isopropyl, sec-butyl, dodecyl and the like; alkenyl such as 1-propenyl, 3-butenyl, 1-pentenyl, 5-hexenyl, 1-heptenyl, 7-octenyl and the like; alkoxy such as propoxy, butoxy, methoxy, isopropoxy, pentoxy, nonoxy, ethoxy, octyloxy and the like; cycloalkyl such as cyclohexyl, cyclooctyl, cycloheptyl, cyclopentyl and the like; cycloalkenyl such as cyclohexenyl, cyclopentenyl and the like; alkoxyalkyl and phenoxyalkyl such phenoxymethylene, phenolxythylene, methoxymethylene, ethoxymethylene, methoxymethylene, butoxymethylene, propoxythylene, and the like; phenylalkyl such as phenethyl, phenylpropyl, benzyl and the like; and substituted alkyl and phenyl groups such cyanomethyl, 3-chloropropyl, 3,4-dichlorophenyl, 3,4-dichoro-3-cyanophenyl, fluorophenyl, fluoromethyl, difluoroethyl, 4-nitrophenyl, phenoxyphenyl, 2,4-dimethoxyphenyl, 4-methylphenyl, 2,4-dimethylphenyl, 2-nitroethyl, nitromethyl, and the like.

Preferred indane bisphenol compounds for use in the practice of the invention are those in which:

$R_3$ and $R_8$ are the same or different and are alkenyl having from 3 to about 10 carbon atoms; and $R_4$, $R_5$, $R_6$, $R_7$ and $R_9$ are the same or different and are hydrogen, alkyl or alkoxy each having from one to about 10 carbon atoms, alkylphenyl or phenylalkyl each having from 7 to about 17 carbon atoms, alkoxyalkyl having from 2 to about 10 carbon atoms or nitro.

In the particularly preferred embodiments indane bisphenol compounds are those in which:

$R_3$ and $R_8$ are the same or different and are alkenyl having from 3 to about 7 carbon atoms; and $R_4$, $R_5$, $R_6$, $R_7$ and $R_9$ are the same or different and are hydrogen or alkyl or alkoxy having from 1 to about 7 carbon atoms.

In the most preferred embodiments of the invention indane bisphenol compounds are:

$R_3$ and $R_8$ are the same or different and are alkenyl having from 3 to about 5 carbon atoms; and $R_4$, $R_5$, $R_6$, $R_7$ and $R_9$ are the same or different and are hydrogen or alkyl having from 1 to about 4 carbon atoms.

Suitable maleimides may be obtained from commercial sources manufactured by methods known to those of skill in the art. For example, suitable maleimides may be prepared by reacting a suitable diamine with a suitable substituted unsaturated dicarboxylic acid anhydride in the presence of a base catalyst as for example a tertiary amine such as triethylamine and organic solvent such as acetone as described in U.S. Pat. Nos. 4,130,564, 3,010,290, British Patent Specification 1,137,592, and French Patent No. 1,555,564.

Indane bisphenol compounds for use in the practice of this invention can be obtained from commercial sources are prepared using conventional processes. For example, such compounds can be prepared by reacting the corresponding indanamine with sodium nitrite in the presence of aqueous acid as described in Wilson, J. C., Journal of Polymer Science: Polymer Chemistry Edition, Vol. 13, p. 749, John Wiley & Sons, Inc. (1975). Also see U.S. Pat. No. 2,979,534. The indanamine can be prepared corresponding by the method of J. C. Petropoulos and J. J. Fisher, J. Amer. Chem. Soc. 80, 1938 (1959) from the corresponding carboxy indane compound.

Molar ratio of indane bisphenol to bis maleimide may vary widely depending on the desired properties. In general, the molar ratio of bisphenol to bis maleimide is from about 1:10 to about 10:1. In the preferred embodiments of this invention the molar ratio of bisphenol to bis-maleimide is from about 5:1 to about 1:5; and in the particularly preferred embodiments of the inventions the molar ratio of bisphenol to bis-maleimide is from about 2:1 to about 1:2. In the most preferred embodiments of the invention the molar ration of indane bisphenol to bis maleimide is from about 1.5:1 to about 1:1.5.

The composition preferably includes a polymerization catalyst. Useful catalysts include ionic and free radical catalysts. Illustrative of useful ionic catalysts are tertiary secondary and primary amines and quaternary ammonium compounds such as diethylamine, tributylamine, triethylamine, triamylamine, benzylamine, tetramethyldiaminodiphenylmethane, N,N-disobutylaminoacetonitrile, N,N-dibutylaminoacetonitrile, N,N-isodibutylaminoacetonitrile, quinoline, N-methylpiperidine, imidazole, benzimidazole, mercaptobenzothiazole, benzyl-trimethylammonium hydroxide and benzyltrimethylammonium methoxide. Other useful ionic catalysts are alkali metal alcoholates and alkali metal hydroxides such as sodium methylate, sodium hydroxide, and sodium ethoxide, and acetyl-acetonates.

Suitable free radical polymerzation catalyst include such catalysts as organic peroxides, azonitriles and hydroperoxides.

The amount of catalysts employed is an amount sufficient to catalyst the reaction. In general, the amount of catalyst employed is from about 0.1 to about 10% by weight based on the total weight of indane bisphenol and bis maleimide. In the preferred embodiments of this invention, the amount of catalyst employed is from about 0.1 to about 5% by weight based on the total weight of reactants.

The precured composition of this can be conveniently prepared by forming a mixture of the reactants. The mixture can be formed using conventional techniques. For example, the composition can be formed by simply melt blending the various components. Alternately, the precured composition can be formed using solution blending techniques. For example, the various components of the precured composition can be dissolved in a volatile solvent such as chlorinated hydrocarbons such as chloromethane, chloroform, 1,2-dichloroethane, and the like; esters such as methyl formate, methyl acetate, ethyl acetate and the like; ketones such as acetone, methyl ethyl ketone, 4-methyl-2-pentanone and the like; and ethers such as tetrahydrofuran, diethyl ether, dimethoxymethane, dioxane and the like. After dissolution, the solvent can be removed by evaporation to provide the precured composition. These methods of forming mixtures are well known and will not be described herein in great detail.

The composition of this invention may include other optional ingredients known to those of skill in the art at any stage before cure. Such optional components include extenders, fillers and reinforcing agents, pigments, dyestuffs, plasticizers, tackifiers, flow control agents, flameproofing agents, agents for conferring thixotropy, and the like. In the preferred embodiments of the invention, the composition includes a filler where the structural integrity and strength of a structure here to be maintained, and for other purposes known to those of skill in the art. Any suitable filler known to those of skill in the art can be used. Such fillers may be selected from a wide variety of organic and nonorganic materials such as polymers, minerals, metals, metal oxides siliceous materials, and metal salts. Illustrative of useful fillers are fiber glass, steel, asbestos fibers aramid, boron and carbon fibers, as well as plate like, fibrous and particulate forms of alumina, brass powder, aluminum hydrates, iron oxide, feldspar, lead oxides, asbestos, talc, calcium corbonates, clay, carbon black, quartz, novaculite and other forms of silica, dalinite, aluminum silicate, betonite, garnet, mica, saponte, beidelite, calcium oxide, fused silica, calcium hydroxide, etc. Other useful fillers include thermoplastic polymer as for example polyesters, polymides, polyamides, polysulfones, polyaramids, polyester carbonates, polyethers, polyethersulfones, polyethylene, polypropylene, polycarbonates, polyetherimides, polysulfides, polyacrylates, polyvinyls and the like. For foregoing recited fillers are illustrative only and are not meant to limit the scope of the fillers that can be utilized in this invention.

The partially cured, incompletely cured and completely cured composition of this invention can be formed merely by heating the precured composition of this invention to elevated temperature for time sufficient cure to the composition to the desired extent using conventional bismaleimide curing techniques. Upon curing at elevated temperature, a network of the desired cross link density is obtained. Curing times and curing temperatures for bis maleimide resins are well known. In general, to form a completely cured composition, the composition is heated at a temperature of from about 60° C. to about 350° C. for from about 10 to about 15 is minutes to about 10 hours. In the preferred embodiments of the invention, the composition is heated at a temperature of from about 100° C. to about 325° C. for from about 30 minutes to about 4 hours. In the particularly preferred embodiments of the invention, the composition is heated to a temperature of from about 150° C. to about 325° C. for from about 30 minutes to about 2 hours.

In general the higher the heating temperature and the longer the heating period the higher the cross linking density. To obtain partially and incompletely cured compositions, generally lower heating temperatures such as from about 75° C. to about 130° C., for shorter durations such as from about 10 to about 60 minutes are used. Conversely, to obtain completely cured compositions, higher heating temperatures such as from about 150° C. to about 350° C. for longer periods of time such as from about 1 hr to about 10 hrs.

The composition of this invention is useful in the fabrication of a wide variety of industrial products. Shaped articles produced from the polymer of this invention include structural parts, warehousings, door windows, apparatus castings, household equipment, components for the electrical and electronics industries, car components and semi-finished products which can be shaped by machinery.

The polymers of this invention are especially suitable for use in the fabrication of composites for use in the manufacture of structural parts. For example, the precured, completely cured, incompletely and partially cured composition of this invention can be used to preimpregnate various organic and/or inorganic fibers for eventual use as structural parts. Techniques for preparing prepregs, pultrusions and filament windings are well known in the art. For example, structural parts reinforced with such fibrous materials as aramid fibers, polyethylene fibers, boron fibers, glass fibers, carbon fibers and the like can be conveniently prepared using the claimed compositions and conventional techniques. Corresponding techniques for preparing laminates are well known and can be used to form laminates composed of the compositions of this invention and conventional fiberous reinforcements. Such laminates may be prepared by compression or autoclave molding.

The following examples are presented to more particularly illustrate the invention and are not to be construed as limitation thereon.

EXAMPLE 1

A. Preparation of Indane Bisphenol

Synthesis of p-2-propenylphenol from bisphenol A

Bisphenol A (228 g, 1 mole) was mixed with sodium hydroxide (0.8 g, 0.02 mole) in a round bottom flask. The flask was connected to the Kugelrohr apparatus under house vacuum (39900 Pa), and heated slowly to 250° C. in the air bath while it was gently rocked by an air operated oscillating motor to prevent bumping. At about 210° C., bisphenol started to decompose into phenol and isopropenyl phenol. Products were collected in the horizontally adjacent water-cooled bulbs. The NMR and mass spectra confirmed the structure of the products. The mixture was purified by vacuum distillation. Phenol (90 g) distilled at 60°–65° C. at 266 Pa vacuum, whereas p-2-isopropenyl phenol (125 g) was collected at 93-95 C at this pressure. The material was stored at 0° C.

2. Synthesis of
1,1,3-trimethyl-3-(p-hydroxyphenyl)-5-indanol 2-p-isopropenylphenol (100 g, 0.746 mole) was dissolved in 400 ml chlorobenzene. To this mixture about 10 ml trifluoroacetic acid was added, followed by stirring for 2.5 hrs. at room temperature. The solution was concentrated to about 200 ml and cooled to room temperature. A total of 94 g of pure indane bisphenol was collected, m.p. 202° C. Mass spectrometry, $^H$ and $^{13}C$ NMR confirmed the structure.

B. Preparation of Diallyl Indane Bisphenol 113 grams (0.422 moles) of indane bisphenol were placed into a one liter, three neck round bottom flask containing a magnetic stir bar and dissolved into 420 ml of n-propanol. 35.4 grams (0.885 moles) of NaOH pellets were added, and a reflux for one hour. After the solution had cooled down to room temperature, 86.0 ml (1.05 moles) of distilled allyl chloride was transferred into the addition funnel by a cannula from a storage flask. The allyl chloride was added slowly over a 20 minute period of time. The reaction mixture became warm, and NaCl began crystallizing out of solution. The reaction mixture was stirred overnight at room temperature and then refluxed for three hours.

The reaction mixture was allowed to cool down to room temperature and was filtered to remove the NaCl. The n-propanol was removed by distillation on a rotary evaporator. The light yellow residue was dissolved in 500 ml of $CH_2Cl_2$, washed with water (3×300 ml), and dried over anhydrous $M_gSO_4$. After several hours, the $M_gSO_4$ was removed by suction filtration, and the $CH_2Cl_2$ was removed by evaporation. About 140 grams of the crude diallyl ether of indane bisphenol was isolated as a light yellow liquid.

140 grams of the diallyl ether of indane bisphenol was placed into a one liter round bottom flask containing a magnetic stir bar and dissolved in 210 grams of 2-(2-ethoxyethoxy) ethanol. The solution was deoxygenated by bubbling dry argon gas through the solution for 15 minutes, and then a reflux condenser was attached. The solution was refluxed for 6 hours under an inert atmosphere. The solvent was removed by vacuum distillation between 60° and 62° C., and the product was collected between 210° and 214° C. as a light yellow, viscous liquid (13.3 Pa). Diallyl indane bisphenol was so viscous that the condenser on the still has to be heated with a hot air gun so that the product could flow into the collection flask; 110 grams of diallyl indane bisphenol were isolated (75% yield overall).

C. Casting of Resin

Diallyl indane bisphenol (DA-IBP) was prepared as described above. Diallyl bisphenol A (DA-BPA) and methylene dianiline bismaleimide (MDA-BMI) were obtained from Ciba-Geigy as Matrimide 5292 components A and B respectively, the purity of which was undetermined.

Thin resin plaques (0.32 cm×20.3 cm×20.3 cm) were prepared as follows. The bismaleimide and the allyl phenol were combined in a round bottom flask at 130° C. and stirred mechanically or spun on a rotovap. Once the mixture was molten, a vacuum (133 to 266 Pa) was slowly applied. Stirring continued for about 30 minutes and then the temperature was raised to 140° C. At this point the solution was deep red, but transparent. It was then poured between glass plates preheated to 160° C. Kapton film and vacuum-bag tape were used to provide a funnel for pouring the mixture. The separation of the plates was set using 0.32 aluminum shims. Vacuum-bag tape was used to contain the molten resin mixture between the plates which were held in place with binder clips. The poured casting was put in a forced-air oven at 160° C. and the temperature was then raised to 180° C. The cure schedule was 1 hr. at 180° C., 2 hrs. at 200° C., and 6 hrs. at 250° C., as suggested by Ciba-Geigy. The samples were cured (solid) in the first stage. The next two stages are post-curing cycles. One set of samples was further postcured at 325° C. for one hour under vacuum.

Samples for fracture toughness testing by chevron notch require a thicker casting. This casting was prepared in a metal trough (0.2 cm×3.8 cm×1.52 cm) using vacuum-bag tape to seal the ends of the trough. As with the thinner castings, MS-136 hot-mold release was used.

Testing

Mechanical testing was done following the procedures outlined in ASTM D638 using type IV tensile dogbones. Brittle failure was observed in all cases. The $T_g$ and shear modulus were determined by torsion experiments on the Rheometrics Dynamic Mechanical Spectrometer. We took as the $T_g$ the knee in the modulus versus temperature curve, which occurs prior to the maximum in tan delta. Fracture toughness measurements were determined by double torsion and chevron notch. The two tests yielded similar results. Double torsion has the advantage of requiring only a thin sample so that tensile and toughness data can be obtained from the same casting.

The dielectric data was obtained on 3.53 squares 0.3 cm thick which were sanded smooth, and then plated with gold/palladium circles on the top and bottom.

Thermal stability was measured by thermogravimetric analysis at a heating rate of 3° C./min.

The results of these tests are set forth in the following Table I.

TABLE I

| Properties | Compositions molar ratio MDA-BMI/DA-BPA | | Compositions molar ratio MDA-BMI/DA-IBP | Hi-T Epoxy[a] |
|---|---|---|---|---|
| | 1.12/1 | 1.01/1 | 0.97/1 | |
| Tg (C.), 250 C. cure | 300 | 283 | 278 | 177 |
| 325 C. cure | — | 278 | 315 | (200 C. cure) |
| at 0.1 MHz | — | 3.0 | 2.9 | 3.5–5 |
| $K_{ic}$ (ksi in) | — | 0.52[b] ± 0.06 | 0.6[c] | — |
| Tensile Properties | | | | |
| modulus (ksi) | 571 ± 19 | 245 ± 18 | 490 ± 16 | 540 |
| strength (ksi) | 11.6 ± 1.1 | 11.9 ± 2.2 | 10.4 ± 0.81 | 8.5 |
| elongation (%) | 2.59 ± 0.32 | 2.74 ± 0.62 | 2.53 ± 0.24 | 1.8 |
| Thermal Stability | | | | |
| T (C.) of 5% weight loss | | | | |
| in air | 415 | 415 | 420 | — |
| in helium | 415 | 415 | 420 | — |
| Water Pick-Up (%) | | | | |
| Room Temperature: | | | | |
| 1 day | 0.88 | 0.67 | 0.85 | |
| 8 days | 2.27 | 1.81 | 2.22 | |
| 14 days | 2.96 | 2.38 | 2.85 | |

TABLE I-continued

| Properties | Compositions molar ratio MDA-BMI/DA-BPA 1.12/1 | Compositions molar ratio MDA-BMI/DA-BPA 1.01/1 | Compositions molar ratio MDA-BMI/DA-IBP 0.97/1 | Hi-T Epoxy[a] |
|---|---|---|---|---|
| 24 days | 3.74 | 3.08 | 3.46 | — |
| 106 F. | | | | |
| 1 day | 2.12 | 1.88 | 2.27 | — |
| 8 days | 4.36 | 4.10 | 3.81 | — |
| 14 days | 4.49 | 4.24 | 3.91 | — |
| 24 days | 4.56 | 4.30 | 3.99 | — |

[a]TGDDM/DDs
[b]chevron notch
[c]double torsion

From Table I one can see that very high glass temperatures can be obtained from these materials. The substitution of indane bisphenol for bisphenol A permits an even higher $T_g$ provided that the cure temperature is high enough to permit complete cure. A final post-cure temperature of 280°–290° C. is probably sufficient to obtain the maximum $T_g$. While the indane provides rigidity and bulkiness which raise the $T_g$ its non-linearity (the indane group is L-shaped) increases the free volume, which we believe is responsible for it's lower modulus and faster water pick-up. However, the slightly lower hydroxyl content per unit mass in the indane bisphenol-containing polymer causes it to have a slightly lower dielectric constant, and to pick up less water at equilibrium at 71.1° C. We believe the same will hold at room temperature when equilibrium is finally achieved. (Solid-state) $^{13}$C NMR established that the phenolic groups are still present after the curing reaction.) The indane-containing polymer is fairly tough for a high $T_g$ polymer.

What is claimed is:

1. A precured heat curable composition comprising a mixture of
   a. one or more polymaleimide compounds of the formula:

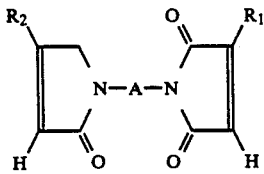

and;
   b. one or more indane bisphenol compounds of the formula:

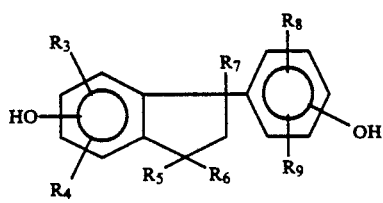

wherein:
   $R_1$, $R_2$, $R_4$, $R_5$, $R_6$, $R_7$ and $R_9$ are the same or different at each occurrence and are hydrogen, alkyl, phenyl, cycloalkenyl, alkylphenyl, alkenyl, alkoxphenyl, phenylalkyl, alkoxy, alkoxyalkyl, nitro, halogen, cyano, cycloalkyl or hydroxy;

A is a divalent organic moiety having from 1 to about 30 carbon atoms; and
   $R_3$ and $R_8$ are the same or different at each occurrence and are alkenyl;
   wherein the open valencies are substituted with hydrogen.

2. A heat curable composition according to claim 1 wherein:
   A is selected from the group consisting of divalent moieties of the formula:

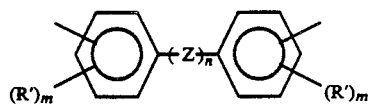

wherein:
   R' is the same of different at each occurrence and is alkyl, alkoxy, fluoro, trihalomethyl, phenyl, alkoxyphenyl, alkylphenyl, phenylalkyl or alkoxyalkyl;
   Z is —O—, —C(O)—, —S—, —SO$_2$— or a moiety of the formula:

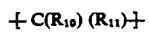

wherein
   $R_{10}$ and $R_{11}$ are the same or different at each occurrence and are hydrogen, alkyl, phenyl or phenyl or alkyl substituted with one or more fluoro groups;
   n is 0 or 1; and
   m is 0, 1 or 2.

3. A heat curable composition according to claim 2 wherein:
   A is selected from the group consisting of divalent moieties of the formula:

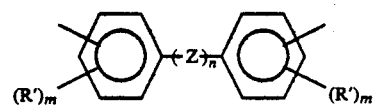

wherein:
   R' is alkyl or alkoxy each having from 1 to about 7 carbon atoms, fluoro, trifluoromethyl;
   n is 0 or 1;
   m is 0, 1 or 2;
   Z is —O—, —C(O), —SO$_2$— or a moiety of the formula:

—C($R_{10}$) ($R_{11}$)— wherein:

$R_{10}$ and $R_{11}$ are the same or different and hydrogen or substituted or unsubstituted phenyl or alkyl having from 1 to about 7 carbon atoms wherein permissible substituents are one or more fluoro groups.

4. A heat curable composition according to claim 3 wherein:

A is a moiety of the formula:

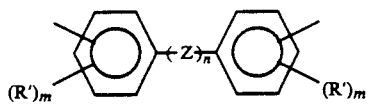

wherein:
n is 0 or 1;
m is 0, 1 or 2;
R' is alkyl having from 1 to about 4 carbon atoms;
Z is —O—, —C(O)—, —SO$_2$— or a moiety of the formula:

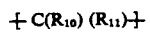

wherein:
$R_{10}$ and $R_{11}$ are the same or different and are hydrogen, phenyl, alkyl or alkyl substituted with one or more fluoro groups.

5. A heat curable composition according to claim 1 wherein:
$R_1$ and $R_2$ are the same or different at each occurrence and are hydrogen or alkyl having from 1 to about 10 carbon atoms.

6. A heat curable composition according to claim 5 wherein:
$R_1$ and $R_2$ are the same or different at each occurrence and are hydrogen or alkyl having from 1 to about 7 carbon atoms.

7. A heat curable composition according to claim 6 wherein:
$R_1$ and $R_2$ are the same or different art are hydrogen or alkyl having from 1 to about 4 carbon atoms.

8. A heat curable composition according to claim 1 wherein:
$R_3$ and $R_8$ are the same or different and are alkenyl having from 3 to about 10 carbon atoms.

9. A heat curable compositions according to claim 8 wherein:
$R_3$ and $R_8$ are the same or different and are alkenyl having from 3 to about 7 carbon atoms.

10. A heat curable composition according to claim 8 wherein $R_3$ and $R_8$ alkenyl having from 3 to about 4 carbon atoms.

11. A heat curable composition according to claim 1 wherein:
$R_4$ and $R_9$ are the same or different and are hydrogen, alkyl or alkoxy each having from one to about 10 carbon atoms, alkylphenyl or phenylalkyl each having from 7 to about 17 carbon atoms, alkoxyalkyl having from 2 to about 10 carbon atoms or nitro.

12. A heat curable composition according to claim 11 wherein:
$R_4$ and $R_9$ are the same or different and area hydrogen, or alkyl or alkoxy each having from 1 to about 7 carbon atoms.

13. A heat curable composition according to claim 12 wherein:
$R_4$ and $R_9$ are the same or different and are hydrogen or alkyl having from 1 to about 4 carbon atoms.

14. A heat curable composition according to claim 1 wherein $R_5$, $R_6$ and $R_7$ are the same or different and are hydrogen or alkyl having from 1 to about 10 carbon atoms.

15. A heat curable composition according to claim 14 wherein:
$R_5$, $R_6$ and $R_7$ are the same or different and are hydrogen or alkyl having from 1 to about 7 carbon atoms.

16. A heat curable compositions according to claim 15 wherein:
$R_5$, $R_6$ and $R_7$ are the same or different and are hydrogen or alkyl having from 1 to about 4 carbon atoms.

17. A cured composition formed by curing the heat curable composition according to claim 1 until from greater than 0 to about 80 mole percent of the curable groups in the composition are reacted as shown by infrared spectrophotometry.

18. A completely cured composition formed by completely curing the heat curable composition according to claim 1.

19. A precured composition comprising:
(a) a particulate filler, a fibrous filler or a combination thereof; and
(b) a precured composition according to claim 1.

20. A cured composition comprising:
(a) a particulate filler, a fibrous filler or a combination thereof; and
(b) a cured composition according to claim 17.

21. A completely cured composition comprising:
(a) a particulate filler, a fibrous filler or a combination thereof; and
(b) a completely cured composition according to claim 18.

* * * * *

UNITED STATES PATENT AND TRADEMARK OFFICE
CERTIFICATE OF CORRECTION

PATENT NO. : 4,988,785
DATED : January 29, 1991
INVENTOR(S) : C.W. Paul, K.M. Patel and S.C. Arnold It is certified that error appears in the above-identified patent and that said Letters Patent is hereby corrected as shown below:

Col. 11, line 39: "mixture of" should read -- mixture of: --.

Col. 11, line 66: "alkoxphenyl" should read -- alkoxyphenyl --.

Col. 14, line 11: "area" should read -- are --.

Signed and Sealed this

Eighteenth Day of May, 1993

Attest:

MICHAEL K. KIRK

Attesting Officer

Acting Commissioner of Patents and Trademarks